(12) United States Patent  
Constantine et al.

(10) Patent No.: US 10,118,552 B1
(45) Date of Patent: Nov. 6, 2018

(54) SYSTEM FOR DETERRING USE OF A MOBILE COMMUNICATIONS DEVICE

(71) Applicants: Alexander Constantine, Charlotte, NC (US); Patricia Clare Landis, Matthews, NC (US)

(72) Inventors: Alexander Constantine, Charlotte, NC (US); Patricia Clare Landis, Matthews, NC (US)

( * ) Notice: Subject to any disclaimer, the term of this patent is extended or adjusted under 35 U.S.C. 154(b) by 0 days.

(21) Appl. No.: 15/725,470

(22) Filed: Oct. 5, 2017

(51) Int. Cl.
*B60Q 9/00* (2006.01)
*H04W 4/80* (2018.01)

(52) U.S. Cl.
CPC ............... *B60Q 9/00* (2013.01); *H04W 4/80* (2018.02)

(58) Field of Classification Search
CPC ........... B60Q 9/00; H04W 4/80; H04W 4/008
See application file for complete search history.

(56) References Cited

U.S. PATENT DOCUMENTS

| | | | |
|---|---|---|---|
| 6,731,925 B2 | 5/2004 | Naboulsi | |
| 7,505,784 B2 | 3/2009 | Barbera | |
| 8,264,340 B2 | 9/2012 | Mazzolini et al. | |
| 8,380,176 B2 | 2/2013 | Adler et al. | |
| 8,401,578 B2 | 3/2013 | Inselberg | |
| 8,538,402 B2 | 9/2013 | Vidal et al. | |
| 8,718,536 B2 | 5/2014 | Hannon | |
| 8,744,417 B2 | 6/2014 | Adler et al. | |
| 8,914,014 B2 | 12/2014 | Vidal et al. | |
| 9,167,418 B1 | 10/2015 | Tuluca | |
| 9,270,809 B2 | 2/2016 | Allen et al. | |
| 2010/0148920 A1 | 6/2010 | Philmon et al. | |
| 2010/0297929 A1* | 11/2010 | Harris | H04K 3/415 455/1 |
| 2015/0263777 A1 | 9/2015 | Fraden | |
| 2017/0030716 A1* | 2/2017 | Ali | G06K 9/00355 |

FOREIGN PATENT DOCUMENTS

| | | |
|---|---|---|
| JP | 16286496 A | 1/1998 |
| KR | 100251143 B1 | 5/2000 |
| KR | 20130116654 A | 10/2013 |

OTHER PUBLICATIONS

English translation of Japanese patent application JP16286496A. Google Patents. Jan. 16, 1998.
English translation of abstract of Korean patent document KR10251143(B1). Espacenet. May 1, 2000.
English translation of Korean patent document KR20130116654A. Google Patents. Oct. 24, 2013.

* cited by examiner

*Primary Examiner* — Leon Flores
(74) *Attorney, Agent, or Firm* — Ashley Law Firm P.C.; Stephen S. Ashley, Jr.

(57) ABSTRACT

A system is disclosed for deterring use of a mobile communications device, such as a mobile phone, in a moving vehicle. The system can comprise a case comprising a housing adapted for containing the mobile communications device therein, and at least one touch sensor positioned on an outer surface of the housing, an alarm unit for producing an alarm, and a motion detection device. The motion detection device can detect motion of the alarm unit. A computing device can be operatively connected to the capacitive touch sensor(s), the motion detection device and the alarm device, and activates the alarm when the touch sensor(s) senses contact by a person and the motion detector device detects motion of the alarm unit.

20 Claims, 10 Drawing Sheets

SYSTEM FOR DETERRING USE OF A MOBILE COMMUNICATIONS DEVICE

TECHNICAL FIELD OF INVENTION

The present invention relates to mobile communications devices, such as cell phones. An embodiment of the invention comprises a system that deters the use of a mobile communications device while operating a motor vehicle.

BACKGROUND OF INVENTION

Mobile communications devices, such as smartphones, have become a fixture of everyday life, with many people routinely using them for hours each day. Smartphones typically provide a variety of communication functions, such as phone, e-mail, and texting. In addition, smartphones can provide other functions, such as video games, Internet access and a wide variety of mobile applications for users to enjoy. The widespread use of mobile communications devices has given rise to a very serious and dangerous problem of distracted driving. That is, people driving motor vehicles while simultaneously using their smartphone device. According to the National Highway Traffic Safety Administration, 3,477 people were killed and 391,000 people were injured in motor vehicle crashes involving a distracted driver in 2015 alone. U.S. Pat. No. 8,264,340 discloses an electronic device fastener, and is incorporated herein by reference. U.S. Patent Application Publication No. 2015/026377 discloses a sensing case for a mobile communications device, and is incorporated herein by reference.

SUMMARY OF INVENTION

One object of the present invention is to provide a kit that deters the use of a mobile communications device, such as a cell phone, in a moving vehicle. Another object of the invention is to provide a cell phone safety system that can be used with existing cell phones. These and other objects of the invention can be obtained in embodiments of the invention described herein.

One embodiment of the present invention comprises a kit for deterring and/or inhibiting the use of a mobile communications device, such as a mobile phone, in a moving vehicle. The kit comprises a case comprising a housing adapted for containing the mobile communications device therein, and at least one touch sensor positioned on an outer surface of the housing, an alarm device adapted for producing an alarm; and a motion detection device. The motion detection device can be adapted to detect motion of the case or adapted to detect motion of the alarm device. A computing device is operatively connected to the at least one capacitive touch sensor, the motion detection device, and the alarm device, and the computing device activates the alarm when the touch sensor(s) senses contact by a person and the motion detector device detects motion.

According to another embodiment of the invention, the computing device and the alarm device are adapted for wireless communication with each other.

According to another embodiment of the invention, the kit includes BLUETOOTH wireless communication technology, so that the computing device transmits a wireless signal to the alarm device that activates the alarm when the touch sensor(s) senses contact by a person and the motion detector device detects motion.

According to another embodiment of the invention, the computing device comprises a computer processor and a non-transitory computer readable storage medium having programming instructions that, when executed, cause the computing device to send a signal to the alarm device that causes the alarm unit to produce the alarm when the capacitive touch sensor(s) senses contact by a person and the motion detector device detects motion.

According to another embodiment of the invention, the case housing is substantially rectangular, and there is a plurality of elongate capacitive touch sensor sections positioned longitudinally on the outer surface of the case housing.

According to another embodiment of the invention, the mobile communications device is a mobile phone, and the case housing is adapted for containing the mobile phone therein. The housing has a substantial rectangular prism shape, and comprises first and second opposed major faces, first and second opposed side faces, and first and second opposed end faces.

According to another embodiment of the invention, a first plurality of elongate capacitive touch sensor sections is positioned longitudinally on one of the major faces.

According to another embodiment of the invention, an elongate capacitive touch sensor section is positioned longitudinally on one side face, and another elongate capacitive touch sensor is positioned longitudinally on the other side face.

According to another embodiment of the invention, the motion detection device comprises an accelerometer, gyroscopic sensor, and/or a global positioning system receiver.

According to another embodiment of the invention, the alarm can be light and/or sound.

According to another embodiment of the invention, an alarm unit houses the alarm device. The motion detection device is positioned in the alarm unit, and is adapted for detecting motion of the alarm unit.

According to another embodiment of the invention, a first microcontroller is positioned in the case and is operatively connected to the touch sensor(s). A second microcontroller is positioned in the alarm unit and operatively connected to the alarm device and the motion detection device.

According to another embodiment of the invention, the alarm device is housed in an alarm unit, and the alarm unit is adapted for releasable attachment to an interior part of an automobile.

According to another embodiment of the invention, the alarm unit includes a suction cup that can be releasably attached to the dashboard in an automobile.

According to another embodiment of the invention, the alarm unit includes a clip adapted to receive and frictionally engage a portion of an automobile sun visor, such that the alarm unit can be attached to the sun visor.

Another embodiment of the invention comprises an apparatus for deterring use of a mobile communications device in a moving vehicle comprising a case comprising a housing adapted for containing a mobile communications device therein, at least one capacitive touch sensor positioned on an outer surface of the housing, an alarm unit adapted for producing an audible alarm, a motion detection device that detects motion of the alarm unit, and at least one microcontroller operatively connected to the capacitive touch sensor(s), the motion detection device, and the alarm unit. The microcontroller sends a signal to the alarm unit activating the alarm when the capacitive touch sensor(s) senses contact by a person and the motion detector device detects movement of the alarm unit.

According to another embodiment of the invention, the microcontroller sends the signal to the alarm unit via BLUETOOTH wireless communication technology.

According to another embodiment of the invention, the motion detection device comprises an accelerometer, gyroscopic sensor, and/or a global positioning system receiver.

According to another embodiment of the invention, the mobile communications device comprises a smartphone, and the case housing is adapted for containing the smartphone therein. The housing has a substantial rectangular prism shape, and comprising first and second opposed major faces, first and second opposed side faces, and first and second opposed end faces.

According to another embodiment of the invention, the first major face includes a transparent section for covering a screen of the smartphone and allowing a user to engage the screen of the smartphone. A plurality of elongate capacitive touch sensors is positioned longitudinally on the second major face of the case housing.

According to another embodiment of the invention, an elongate capacitive touch sensor is positioned longitudinally on the first side face, and a second elongate capacitive touch sensor is positioned longitudinally on the second side face.

Another embodiment of the invention comprises a mobile communications safety kit comprising a mobile phone device having at least one capacitive touch sensor positioned on an outer surface of the mobile phone device, an alarm unit adapted for producing an audible alarm, a motion detection device operatively connected to the alarm unit, such that the motion detection device can detect motion of the alarm unit, and a microcontroller operatively connected to the least one capacitive touch sensor, the motion detection device, and the alarm unit. The microcontroller sends a signal to the alarm unit activating the alarm when the at least one capacitive touch sensor senses contact by a person and the motion detector device detects movement of the alarm unit.

According to another embodiment of the invention, the mobile phone device is comprised of a mobile phone or a case adapted for containing a mobile phone therein. The mobile phone device can have a substantial rectangular prism shape, and has first and second opposed major faces, first and second opposed side faces, and first and second opposed end faces.

According to another embodiment of the invention, a plurality of elongate touch sensors is positioned longitudinally on the first major face of the mobile phone device.

According to another embodiment of the invention an elongate touch sensor is positioned longitudinally on the first side face, and a second elongate touch sensor is positioned longitudinally on the second side face.

Another embodiment of the invention comprises a method of deterring use of a mobile communications device in a moving vehicle that includes providing a case comprising a housing and at least one capacitive touch sensor positioned on the outer surface of the housing, and positioning the mobile communications device in the case housing. An alarm unit can produce a sound and/or light alarm, and a motion detection device is operatively connected to the alarm unit to detect motion of the alarm unit. The alarm unit produce the alarm when the capacitive touch sensor(s) senses contact by a person and the motion detector device detects motion of the alarm unit.

According to another embodiment of the invention, a computing device, such as a microcontroller, comprises a computer processor and a non-transitory computer readable storage medium having programming instructions that, when executed, cause the computing device to send a signal to the alarm unit that causes the alarm unit to produce the alarm when the capacitive touch sensor(s) senses contact by a person and the motion detector device detects motion.

DETAILED DESCRIPTION OF PREFERRED EMBODIMENTS OF INVENTION

Figure 1:
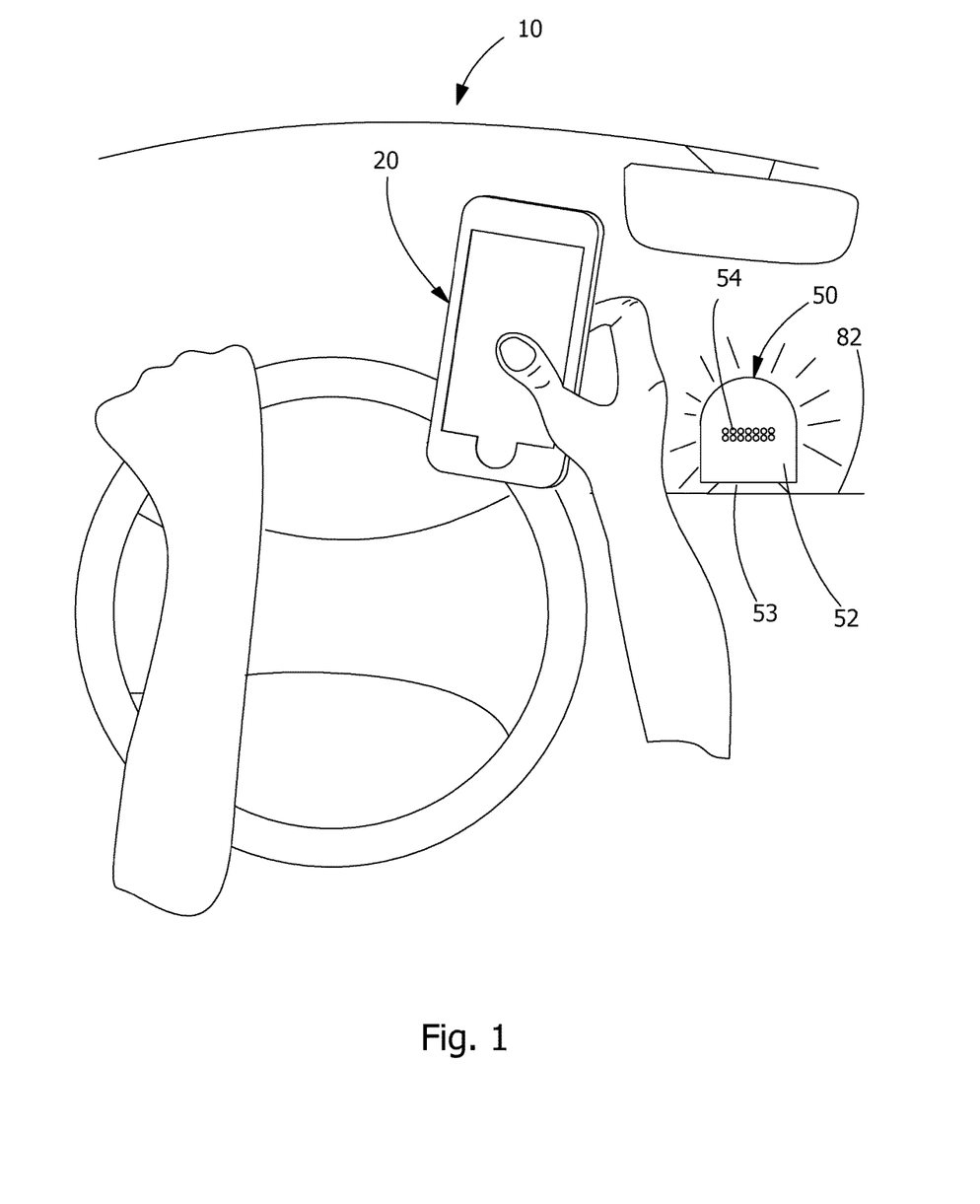
FIG. 1 is a perspective environmental view of a safety kit according to a preferred embodiment of the invention.

A kit for deterring use of a mobile communications device in a moving vehicle comprising, according to a preferred embodiment of the invention, is illustrated in FIGS. 1-8, and shown generally at reference numeral 10 in FIG. 1. The kit 10 comprises a case 20 adapted for containing a mobile communications device, and an alarm unit 50. The mobile communications device can be a cell phone, such as a smartphone, or other similar device.

Figure 2:
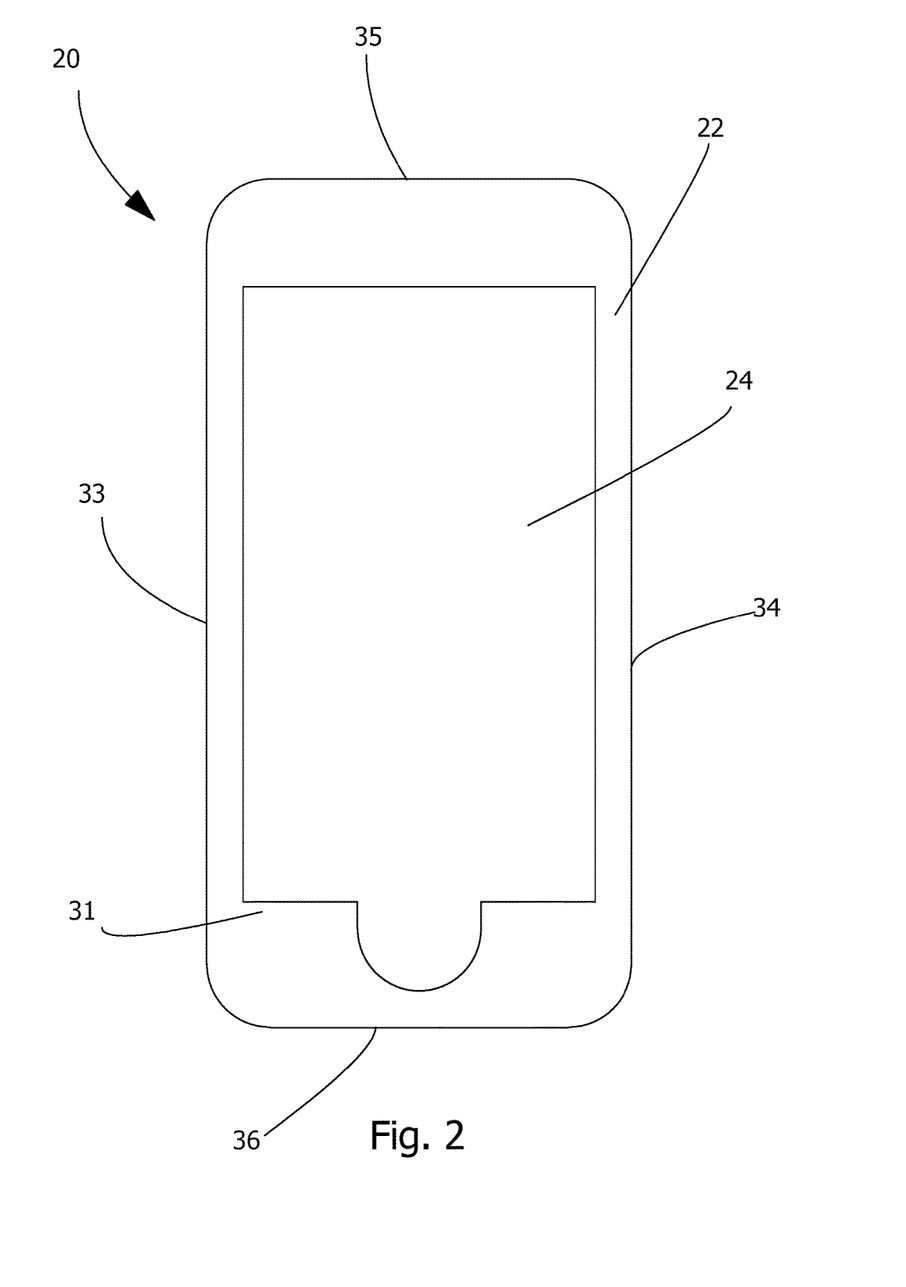
FIG. 2 is a front view of a mobile phone case according to a preferred embodiment of the invention.

The case 20 can comprise a housing 22 having a structure suitable for containing a smartphone therein. The case housing 22 has a shape substantial to a rectangular prism, as shown in FIGS. 2-5. The case housing 22 includes a pair of opposed major faces 31, 32, a pair of opposed side faces 33, 34, and a pair of opposed end faces 35, 36. The case housing 22 can be made of plastic, or other suitable material, that can absorb impact and protect the phone from damage. As shown in FIG. 2, one of the major faces 31 of the housing 22 includes a transparent section 24 that covers the screen of the smartphone and allows the user to tap and engage the screen of the smartphone.

Figure 3:
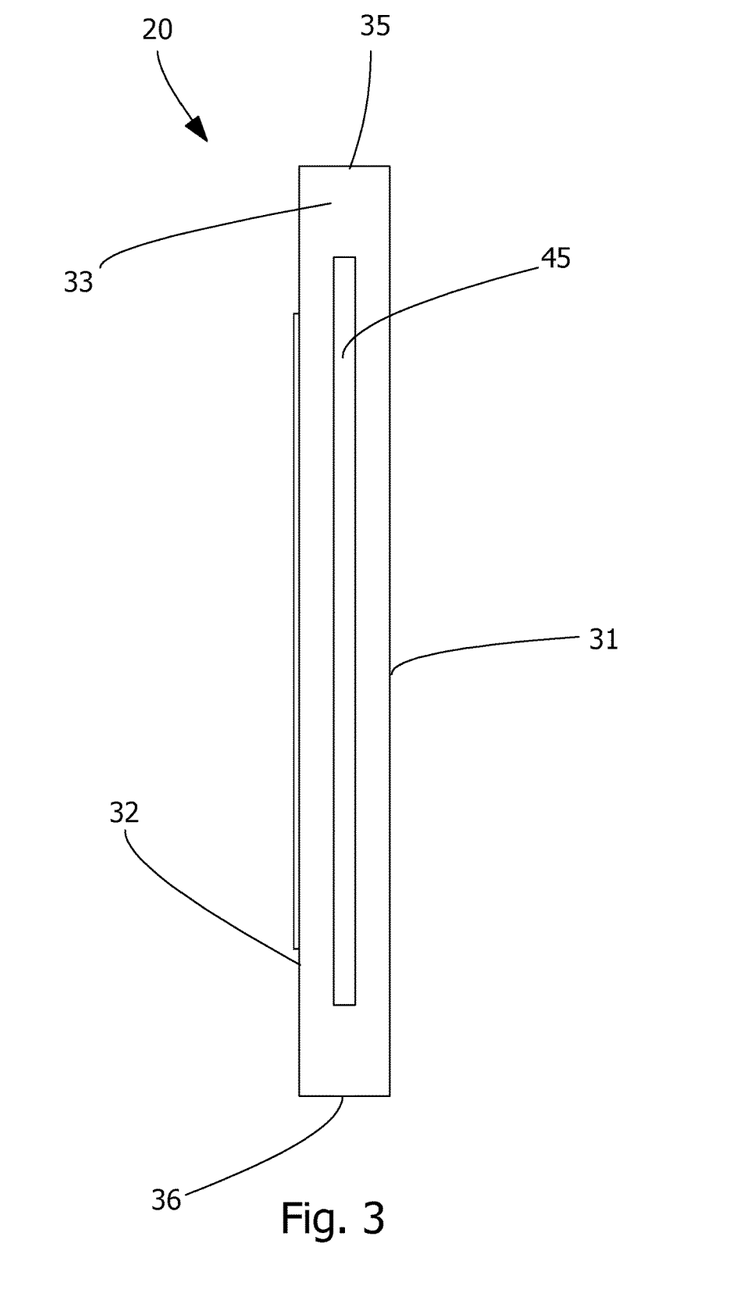
FIG. 3 is a side view of the mobile phone case of FIG. 2.
Figure 4:
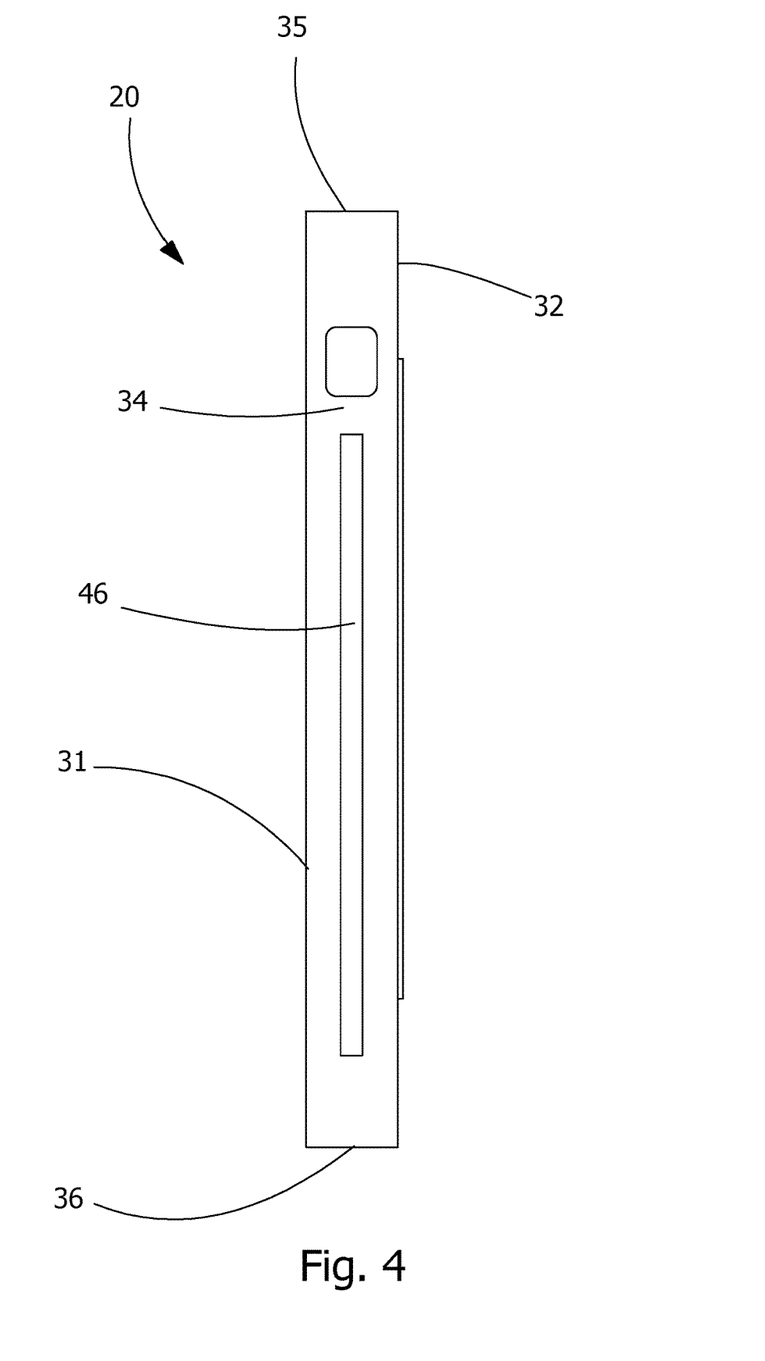
FIG. 4 is another side view of the mobile phone case of FIG. 2.
Figure 5:
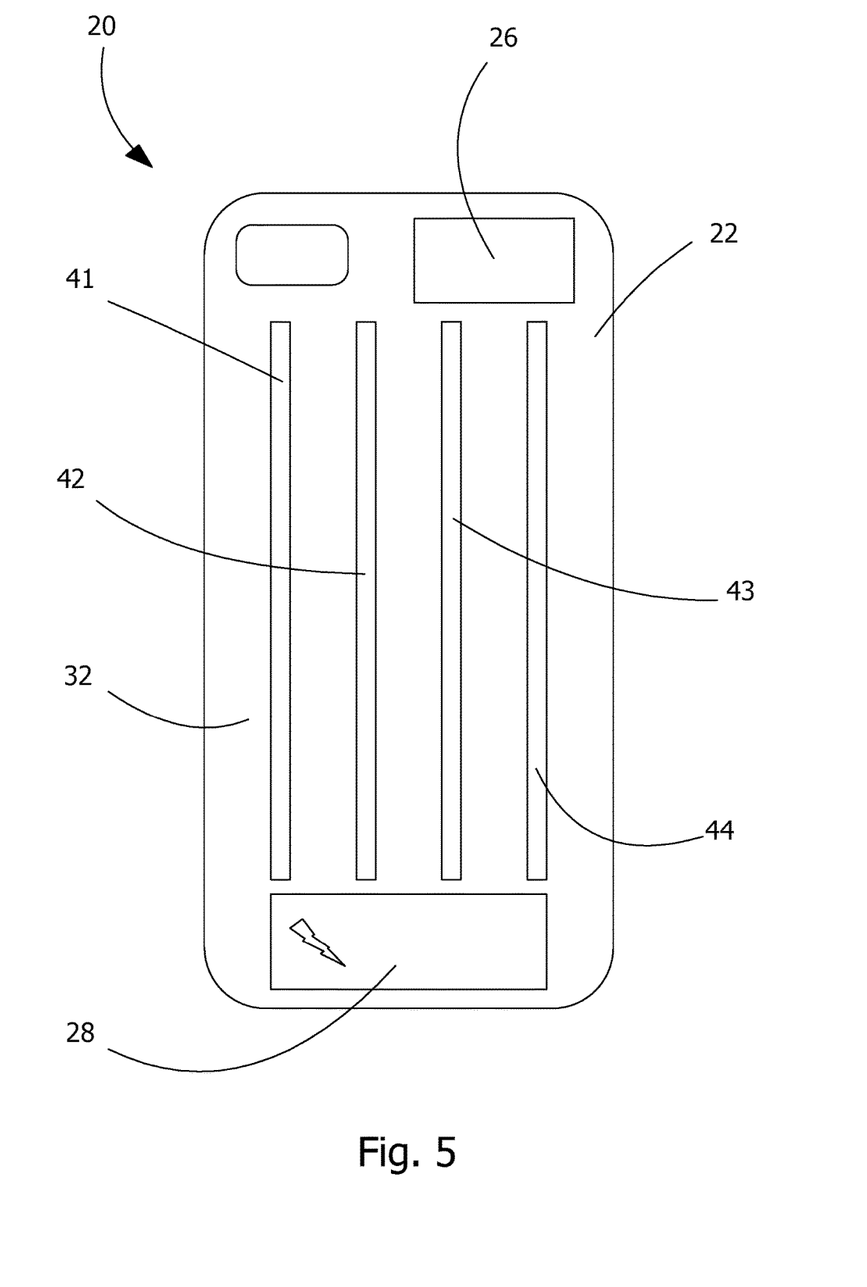
FIG. 5 is a rear view of the mobile phone case of FIG. 2.

The case 20 includes touch sensors positioned on the outer surface of the case body 22. Preferably, the touch sensors are capacitive touch sensors, and are in the form of elongate sections 41-46 extending lengthwise on the case housing 22, as shown in FIGS. 3-5. The touch sensor pads 41-46 can comprise copper tape. Four sensor pads 41-44 can be positioned on the major face 32 of the housing (opposite major face 31), as shown in FIG. 5. A touch sensor pad 45 is positioned on a side face 33, shown in FIG. 3, and another touch sensor pad 46 is positioned on the opposite side face 34, as shown in FIG. 4. The case 20 can include a computing device, such as a microcontroller 26, that can receive and process data from the touch sensors 41-46. The microcontroller 26 includes a transmitter for transmitting the data to a receiver. The case 20 can include a power source, such as a battery 28, that provides power to the touch sensors 41-46 and the microcontroller 26. Alternatively, the microcontroller can be placed at another position on the case 20, such as where the battery 28 is shown located in FIG. 5.

The alarm unit 50 can comprise a pod that houses an alarm device adapted for producing an alarm, such as sound and/or light. Preferably, the alarm pod 50 comprises a housing 52 that houses an alarm device, such as an audio speaker 54. Alternatively, the alarm device can be a light emitting device, such as light emitting diodes (LEDs) or incandescent lights. In another embodiment of the invention, the alarm pod 50 can include means for producing both sound and light alarms.

Figure 6:
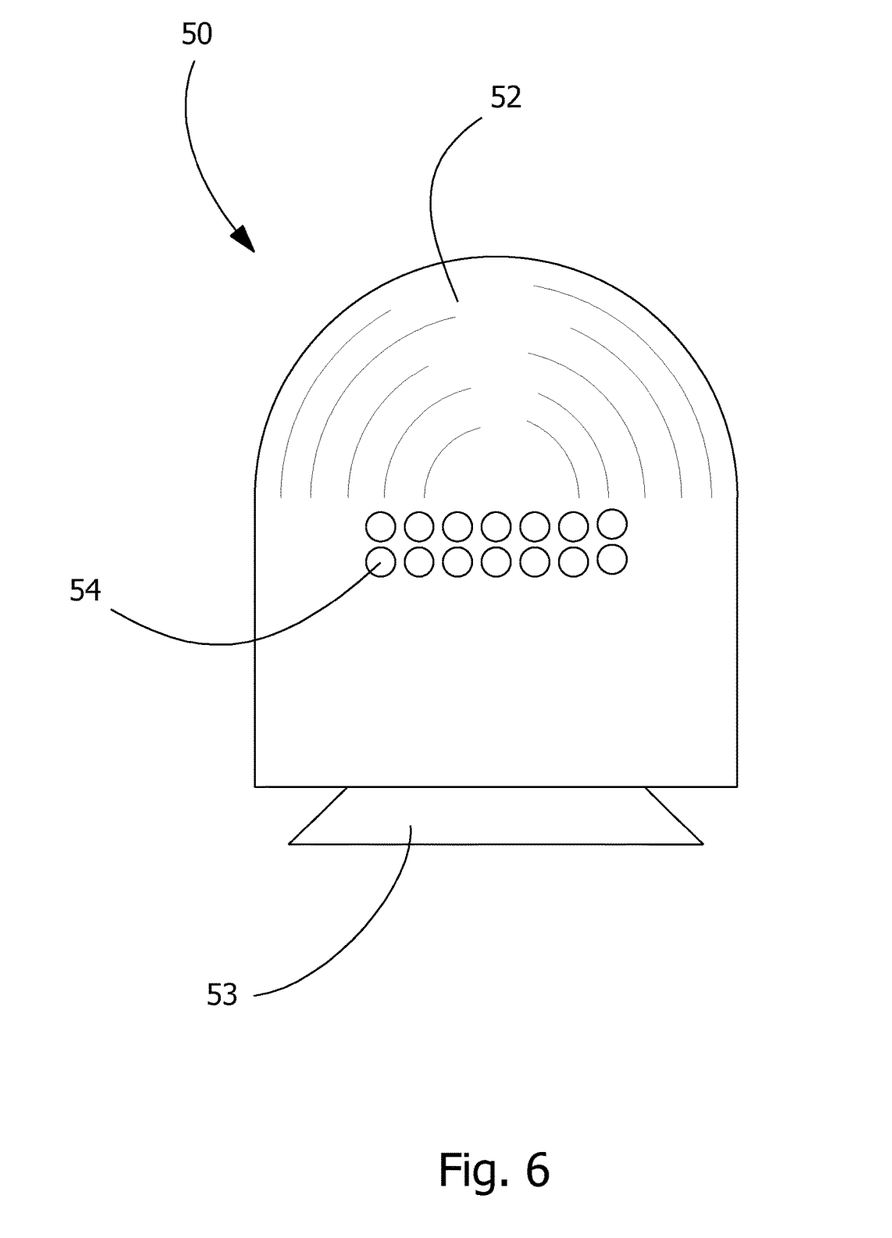
FIG. 6 is front elevation view of an alarm unit according to a preferred embodiment of the invention.

The alarm pod 50 can includes means for releasably attaching the alarm pod 50 to the interior of an automobile. As shown in FIG. 6, a vacuum suction cup 53 can be attached at the base of the housing 52. The alarm pod 50 can be positioned on an automobile dashboard 82, and a user can press down on the alarm pod housing 52 to attach the alarm pod 50 to the dashboard 82, as shown in FIG. 1. The suction cup 53 securely holds the pod 50 on the dashboard 82 for a period of time. The pod 50 can be detached from the dashboard 82 by pulling upwardly on the housing 52.

Figure 7:
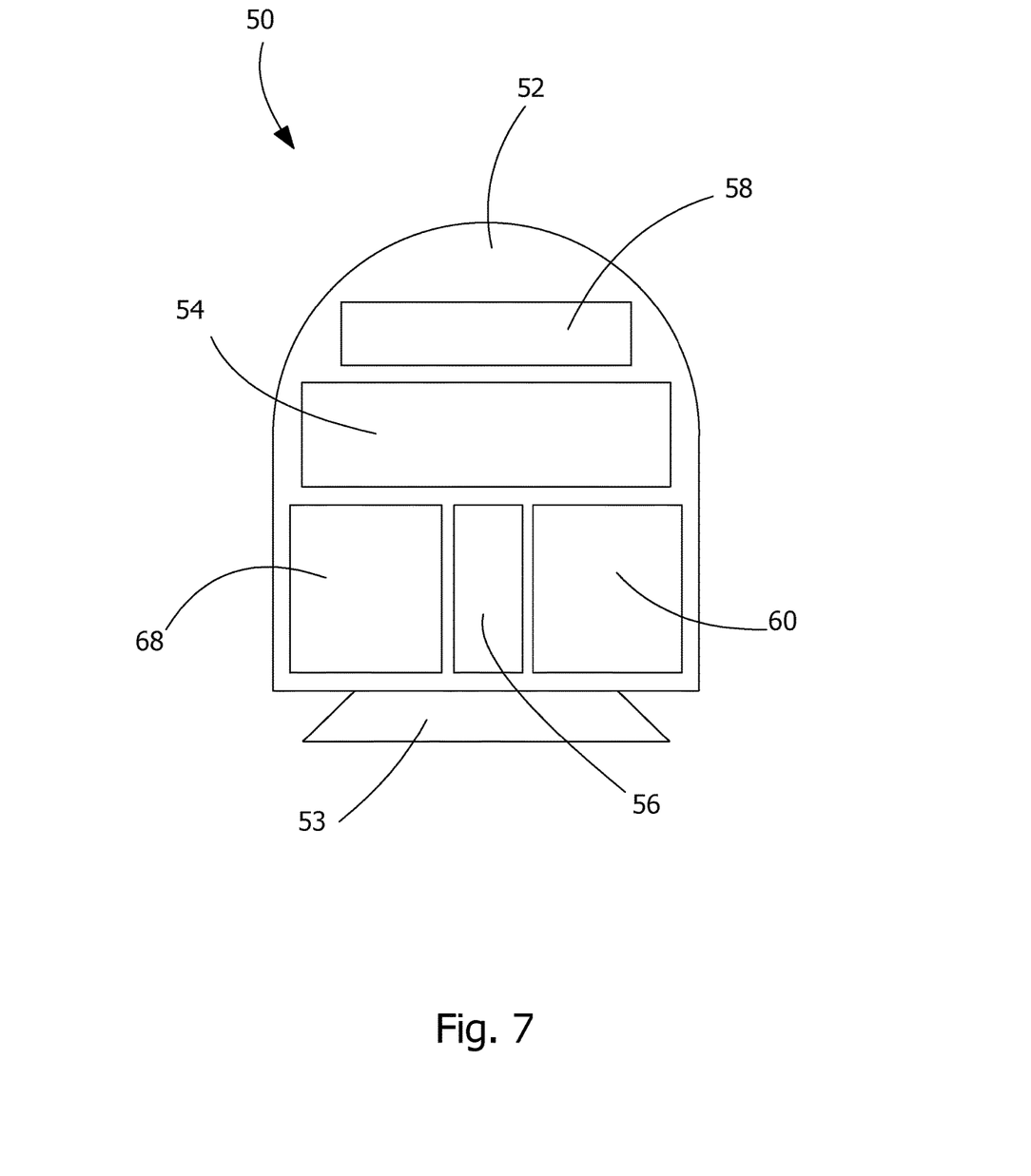
FIG. 7 is a cross sectional schematic view of the alarm unit of FIG. 6.

The kit 10 includes means for detecting motion of the alarm unit 50 and/or the case 20. A motion detection device 60 can be positioned in the alarm pod housing 52, as shown in FIG. 7. The motion detection device 60 can comprise a global positioning system receiver, an accelerometer, and/or gyroscopic sensor. Preferably, the motion detection device 60 comprises a global positioning system receiver or accelerometer that can detect motion of the alarm pod 50, and determine the speed and/or velocity at which the alarm pod 50 is moving. In an alternative embodiment, the motion detection device 60 can be housed in the phone case 20, and be adapted for detecting motion of the phone case 20.

The alarm pod 50 includes a computing device comprising a computer processor, such as a microcontroller 56, shown in FIG. 7. The microcontroller 56 is operatively connected to the motion detection device 60 and the alarm speaker 54. The microcontroller 56 can receive data from the motion detection device 60, and can activate the alarm speaker 54.

The alarm pod 50 includes a receiver 58 that is operatively connected to the case microcontroller 26 and the alarm pod microcontroller 56. The microcontroller/transmitter 26 can transmit data from the touch sensors 41-46 to the receiver 58, and the receiver 58 can transmit the data to the alarm pod microcontroller 56. Preferably, the kit 10 includes wireless communication technology sold under the mark "BLUETOOTH" that enables the microcontroller 26 to communicate wirelessly with the alarm pod receiver 58. Alternatively, the microcontroller 26 can be connected by a wire to the alarm pod receiver 58. The alarm unit 50 includes a power source, such as a battery 68, that provides power to microcontroller 56, receiver 58, alarm speaker 54, and motion detector 60.

Figure 8:
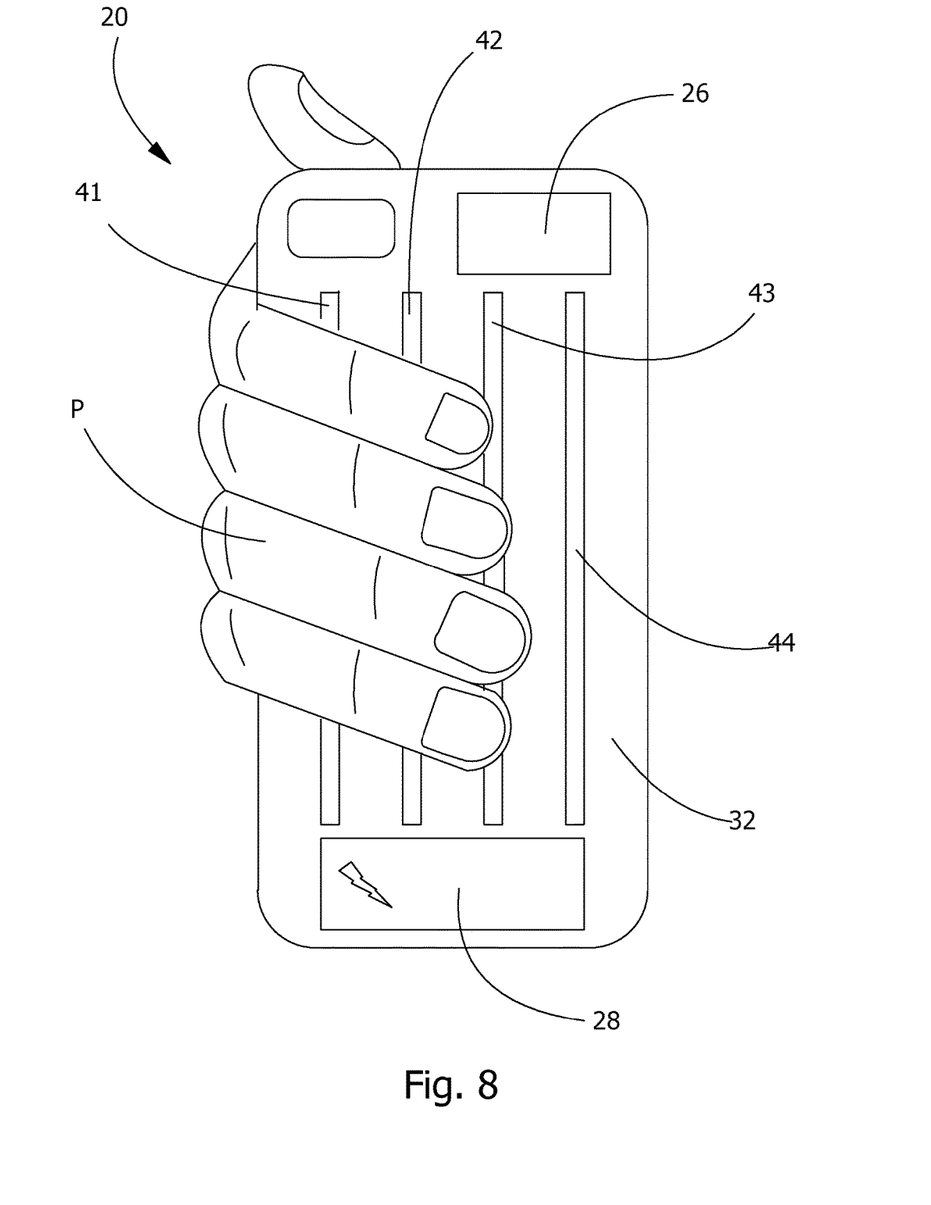
FIG. 8 is an environmental view of the phone case of FIG. 2.

When a person "P" grasps the phone case 20 and contacts one or more of the touch sensors 41-46, as shown in FIG. 8, a signal is sent from the contacted sensor(s) to the microcontroller 26, and the microcontroller transmits a signal, via BLUETOOTH wireless technology, to the receiver 58 of the alarm pod 50, which is received by the alarm pod 50 microcontroller 56. If at the time of receiving this signal from touch sensors 41-46 indicating the case 20 is being touched, the microcontroller 56 is also receiving a signal from the motion detection device 60 that indicates the alarm pod 50 is in motion, then the microcontroller 56 activates the alarm speaker 54 causing the speaker 54 to produce a loud sound. If at the time of receiving the signal from the touch sensors 41-46, the motion detection device 60 does not detect any motion of the alarm pod 50, then the microcontroller 56 does not activate the alarm speaker 50. When the touch sensors 41-46 no longer sense a person's touch or when the motion detection device 60 no longer detects movement of the alarm pod 50, the microcontroller 56 can send a signal to the alarm speaker 54 that stops the alarm speaker from producing the alarm sound. The microcontroller 56 can comprise a computer processor and a non-transitory computer readable storage medium comprising software having programming instructions that, when executed, cause the microcontroller 56 to carry out the above described steps.

In an alternative embodiment, the motion detection device 60 comprises means for determining the speed at which the alarm pod 50 is moving, such as a global positioning system receiver or accelerometer. The microcontroller 56 can be programmed such that the alarm speaker 54 is activated when a touch sensor 41-46 is contacted and the alarm pod 50 moves at a speed exceeding a predetermined minimum speed, such as five miles per hour.

When the driver of a moving automobile grasps his or her phone, the alarm speaker 54 produces an audible alarm that alerts and reminds the driver that he/she should put the phone down and refrain from using it while driving. The alarm can be loud and persistent, making it annoying and unpleasant for the driver to continue handling the phone. Since the alarm 54 is not activated when the motion detector 60 does not detect motion of the alarm pod 50, the driver is free to use the phone when the automobile is stopped.

The kit 10 can be used with existing phones and other mobile communications devices. As such, the kit 10 can be sold as an after-market product. No changes need to be made to the user's existing phone. No application software needs to be added to the user's phone.

In another embodiment of the invention, the kit 10 does not include a case, but instead a mobile phone that has the components of the case 20 integrated directly onto the phone. In such an embodiment, the case 20 shown in FIGS. 1-5 can be the phone itself, and the capacitive touch sensors 41-46 are positioned directly onto the phone. The microcontroller 26 and battery 28 can be integrated parts of the phone.

In another alternative embodiment, the microcontroller 56 can be programmed to send a communication, such as a text or e-mail, to a specified destination, such as a smartphone or e-mail account of a parent or other third-party, whenever the alarm 54 is activated. As such, a parent can be notified when a child has attempted to use his or her phone while driving.

Figure 9:
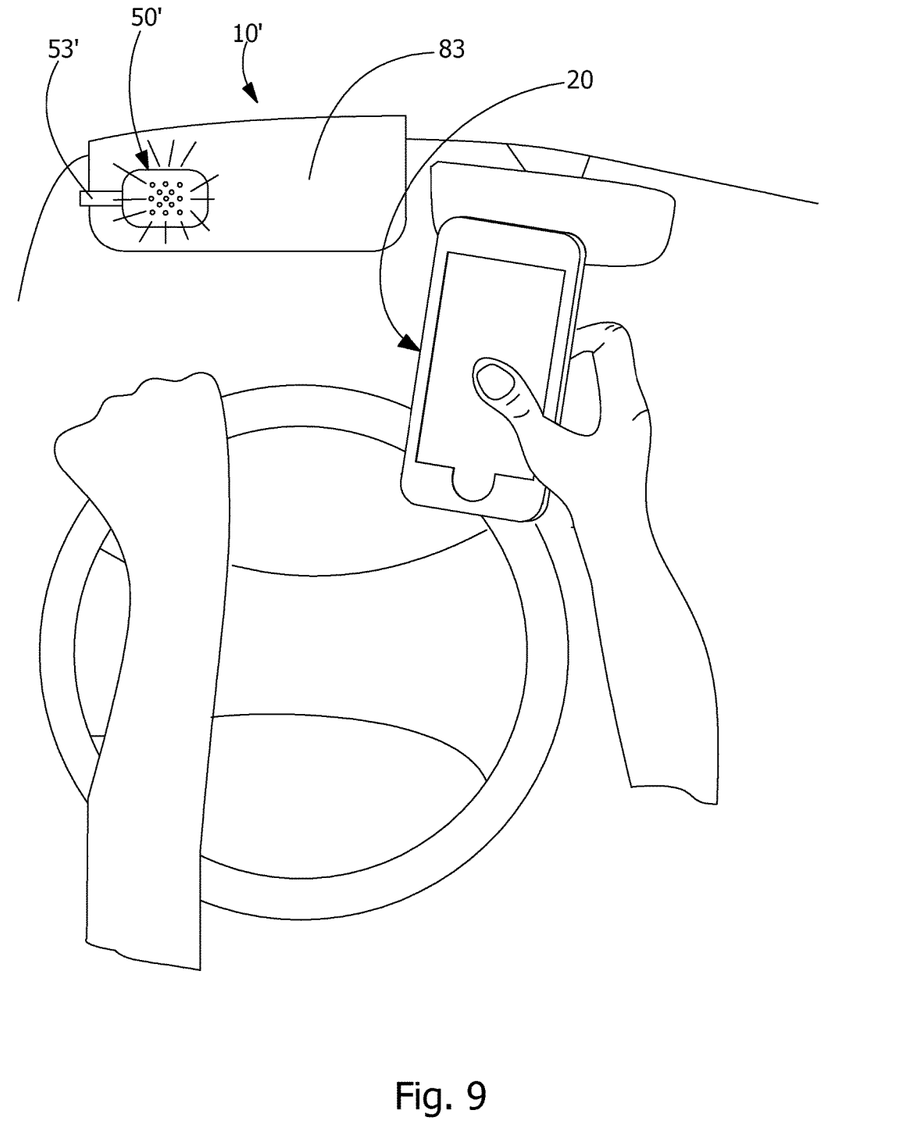
FIG. 9 is an environmental perspective view of an apparatus according to another preferred embodiment of the invention.
Figure 10:
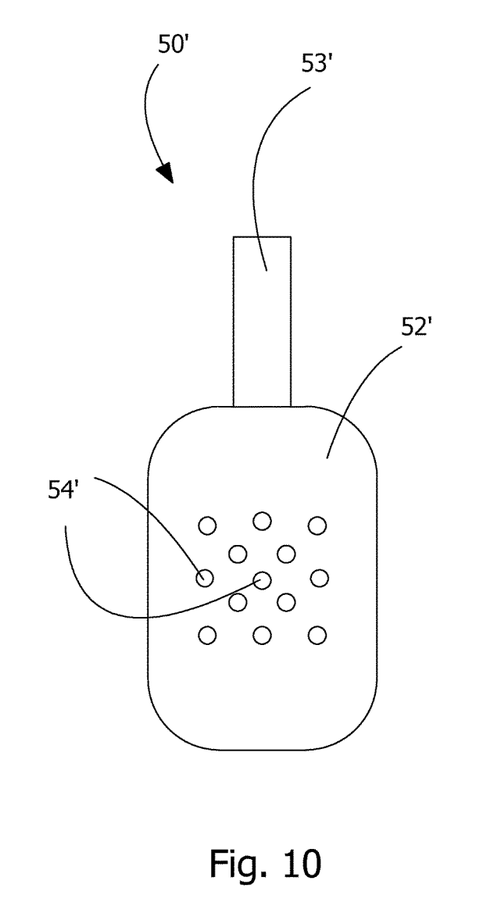
FIG. 10 is a top view of an alarm unit according to another preferred embodiment of the invention.
Figure 11:
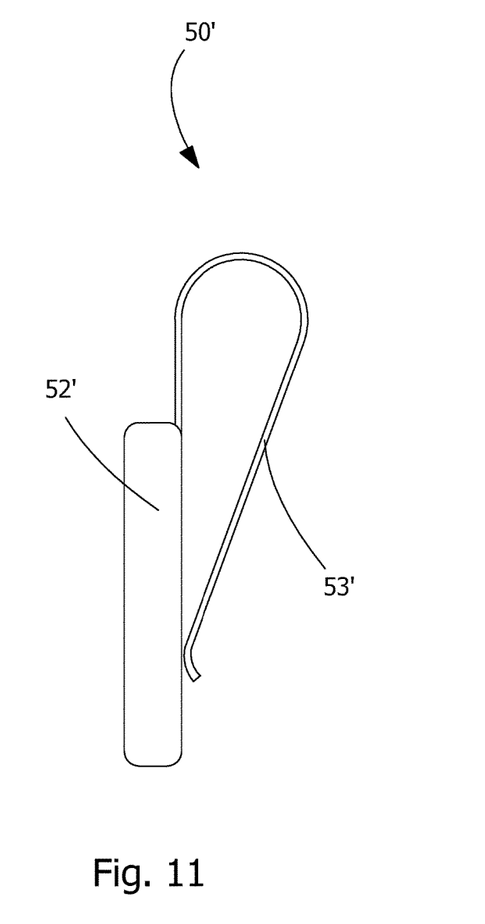
FIG. 11 is a side view of the alarm unit of FIG. 10.

Another preferred embodiment of the invention is illustrated in FIGS. 9-11 and shown generally at reference numeral 10'. The kit 10' comprises the same case 20 as described above, and functions identically as the previously described embodiment 10. Kit 10' comprises an alarm unit 50' having a clip member 53' that can receive and frictionally engage an automobile sun visor 83, as shown in FIG. 9. As such, the alarm unit 50' can be releasably attached to the automobile sun visor 83. The alarm unit housing 52' and clip member 53' are similar in size and design to a garage door opener remote control. The alarm unit 50' is otherwise identical to the alarm unit 50 described above. The alarm unit 50' has a speaker 54' and the other interior components of the previously described alarm unit 50.

A kit for deterring the use of a mobile communications device in a moving vehicle and a method of using same are described above. Various changes can be made to the invention without departing from its scope. The foregoing description of various embodiments of the invention are provided for the purpose of illustration only and not limitation—the invention being defined by the following claims and equivalents thereof.

What is claimed is:

1. A kit for deterring use of a mobile communications device in a moving vehicle comprising:
    (a) a case comprising a housing adapted for containing a mobile communications device therein, and at least one touch sensor positioned on an outer surface of the housing;
    (b) an alarm device adapted for producing an alarm comprising visible light or audible sound;
    (c) a motion detection device adapted for detecting motion of the case or adapted for detecting motion of the alarm device; and
    (d) a computing device operatively connected to the at least one capacitive touch sensor, the motion detection device, and the alarm device, wherein the computing device causes the alarm device to produce visible light or audible sound to emanate from the alarm device when the at least one touch sensor senses contact by a person and the motion detector device detects motion.

2. The kit according to claim 1, wherein the computing device and the alarm device are adapted for wireless communication with each other.

3. The kit according to claim 2, further comprising BLUETOOTH wireless communication technology, whereby the computing device transmits a wireless signal to the alarm device that causes the alarm device to produce visible light or audible sound to emanate from the alarm device when the at least one touch sensor senses contact by a person and the motion detector device detects motion.

4. The kit according to claim 1, wherein the housing of the case is substantially rectangular, and the at least one touch sensor comprises a plurality of elongate capacitive touch sensor sections positioned longitudinally on the case housing.

5. The kit according to claim 1, wherein the mobile communications device comprises a mobile phone, and the housing of the case is adapted for containing the mobile phone therein, the housing having a substantial rectangular prism shape, and comprising first and second opposed major faces, first and second opposed side faces, and first and second opposed end faces.

6. The kit according to claim 5, wherein the at least one touch sensor comprises a first plurality of elongate capacitive touch sensor sections positioned longitudinally on at least one of the first and second opposed major faces, and a second plurality of elongate capacitive touch sensor sections positioned longitudinally on at least one of the first and second opposed side faces.

7. The kit according to claim 1, wherein the motion detection device comprises at least one from the group consisting of an accelerometer, gyroscopic sensor, and a global positioning system receiver.

8. A kit for deterring use of a mobile communications device in a moving vehicle comprising:
    (a) a case comprising a housing adapted for containing a mobile communications device therein, and at least one touch sensor positioned on an outer surface of the housing;
    (b) an alarm device adapted for producing an alarm;
    (c) a motion detection device adapted for detecting motion of the case or adapted for detecting motion of the alarm device;
    (d) a computing device operatively connected to the at least one capacitive touch sensor, the motion detection device, and the alarm device, wherein the computing device activates the alarm when the at least one touch sensor senses contact by a person and the motion detector device detects motion;
    (e) wherein the mobile communications device comprises a mobile phone, and the housing of the case is adapted for containing the mobile phone therein, the housing having a substantial rectangular prism shape, and comprising first and second opposed major faces, first and second opposed side faces, and first and second opposed end faces; and
    (f) wherein the at least one touch sensor comprises a first plurality of elongate capacitive touch sensor sections positioned longitudinally on one of the first and second opposed major faces, and a second plurality of elongate capacitive touch sensor sections comprised of a first elongate section positioned longitudinally on the first side face, and a second elongate section positioned longitudinally on the second side face.

9. A kit for deterring use of a mobile communications device in a moving vehicle comprising:
    (a) a case comprising a housing adapted for containing a mobile communications device therein, and at least one touch sensor positioned on an outer surface of the housing;
    (b) an alarm device adapted for producing an alarm;
    (c) a motion detection device adapted for detecting motion of the case or adapted for detecting motion of the alarm device;
    (d) a computing device operatively connected to the at least one capacitive touch sensor, the motion detection device, and the alarm device, wherein the computing device activates the alarm when the at least one touch sensor senses contact by a person and the motion detector device detects motion; and
    (e) an alarm unit housing the alarm device, and wherein the motion detection device is positioned in the alarm unit and is adapted for detecting motion of the alarm unit.

10. The kit according to claim 9, wherein the alarm comprises at least one selected from the group consisting of light and sound.

11. The kit according to claim 9, wherein the computing device comprises a first microcontroller positioned in the case and operatively connected to the at least one touch sensor, and a second microcontroller positioned in the alarm unit and operatively connected to the alarm device and the motion detection device.

12. The kit according to claim 11, wherein the first microcontroller sends a signal to the second microcontroller activating the alarm when the at least one capacitive touch sensor senses contact by a person and the motion detector device detects movement of the alarm unit.

13. The kit according to claim 12, wherein the first microcontroller sends the signal to the second microcontroller via BLUETOOTH wireless communication technology.

14. The kit according to claim 9, wherein the motion detection device comprises at least one from the group consisting of an accelerometer, gyroscopic sensor, and a global positioning system receiver.

15. The kit according to claim 9, wherein the mobile communications device comprises a mobile phone or a case adapted for containing the mobile phone therein, the mobile communications device having a substantial rectangular prism shape, and comprising first and second opposed major faces, first and second opposed side faces, and first and second opposed end faces.

16. The kit according to claim 15, wherein the at least one capacitive touch sensor comprises a plurality of elongate sections comprised of a first elongate section positioned longitudinally on the first side face, and a second elongate section positioned longitudinally on the second side face.

17. The kit according to claim 9, wherein the computing device comprises a computer processor and a non-transitory computer readable storage medium having programming instructions that, when executed, cause the computing device to send a signal to the alarm unit that causes the alarm unit to produce the alarm when the at least one touch sensor senses contact by a person and the motion detector device detects motion.

18. A kit for deterring use of a mobile communications device in a moving vehicle comprising:
 (a) a case comprising a housing adapted for containing a mobile communications device therein, and at least one touch sensor positioned on an outer surface of the housing;
 (b) an alarm device adapted for producing an alarm;
 (c) a motion detection device adapted for detecting motion of the case or adapted for detecting motion of the alarm device;
 (d) a computing device operatively connected to the at least one capacitive touch sensor, the motion detection device, and the alarm device, wherein the computing device activates the alarm when the at least one touch sensor senses contact by a person and the motion detector device detects motion; and
 (e) an alarm unit housing the alarm device, and wherein the alarm unit is adapted for releasable attachment to an interior part of an automobile.

19. The kit according to claim 18, wherein the alarm unit comprises at least one selected from the group consisting of a suction cup that can be releasably attached to a dashboard in an automobile, and a clip adapted to receive and frictionally engage a portion of an automobile sun visor.

20. The kit according to claim 18, wherein the mobile communications device comprises a mobile phone or a case adapted for containing the mobile phone therein, the mobile communications device having a substantial rectangular prism shape, and comprising first and second opposed major faces, first and second opposed side faces, and first and second opposed end faces, wherein the at least one capacitive touch sensor comprises a first capacitive touch sensor positioned longitudinally on the first side face, and a second capacitive touch sensor positioned longitudinally on the second side face.

* * * * *